CIRCUIT ARRANGEMENTS EMPLOYING SEMI-CONDUCTOR DIODES

Filed Sept. 5, 1961 3 Sheets-Sheet 1

CIRCUIT ARRANGEMENTS EMPLOYING SEMI-CONDUCTOR DIODES

Filed Sept. 5, 1961

United States Patent Office 3,197,564
Patented July 27, 1965

3,197,564

CIRCUIT ARRANGEMENTS EMPLOYING SEMI-CONDUCTOR DIODES

Harold James Stirling, Orpington, England, assignor to Associated Electrical Industries Limited, London, England, a British company Filed Sept. 5, 1961, Ser. No. 136,064
Claims priority, application Great Britain, Sept. 7, 1960, 30,831/60; Apr. 27, 1961, 15,290/61
4 Claims. (Cl. 179—18)

This invention realtes to circuit arrangements employing as static switching elements semi-condutcor devices of a kind which, by application thereto of an appropriate switching voltage, can be changed from a definite "off" or high impedance condition to a definite "on" or low impedance condition in which it can thereafter be held by maintaining through it a holding current of more than a certain minimum value herein called the holding current value for the device, reversion to the high impedance condition taking place immediately the bias current calls below a certain minimum value. Such devices will hereinafter be referred to as being of the kind specified.

One form of semi-conductor device of this kind is the four-zone semi-conductor diode, which is a two-electrode semi-conductor device which has the above characteristics and can be changed from a high impedance condition to a low impedance condition between its electrodes by applying an appropriate switching voltage across them. Another form is the so-called trigger diode or controlled diode which is a three-electrode device having collector, emitter and base electrodes and which having the above characteristics can be changed from a high impedance condition to a low impedance condition between its collector and emitter electrodes by applying a switching voltage between its emitter and base electrodes, holding current being fed through it between its emitter and collector electrodes.

These characteristics of a semi-conductor device of the kind specified make it eminently suited for use as a static switching element presenting between two conductors which it interconnects, according to its condition, either a high "off" impedance or a low "on" impedance in respect of the transmission of A.C. communication currents (for example speech currents) between these two conductors. For instance such semi-conductor diodes can be used in this fashion as cross-point switching devices in co-ordinate switching arrangements for use in telephone exchange systems. However A.C. communication currents transmitted through either one of these forms of semi-conductor diodes in its low impedance condition combine with the direct current bias also flowing through the diode to give a resultant current which at any instant can be greater or less than the direct current bias according to whether the instantaneous A.C. communication current is of the same or opposite polarity with respect to the direct current bias. It therefore becomes necessary to control the magnitude of the direct current bias and/or of the A.C. communication currents in some way appropriate for ensuring that when the instantaneous A.C. communication current is of opposite polarity to the direct current bias, the resultant current through the diode does not fall below the diode's holding current value because if it does, the diode will revert to its high impedance condition, thereby blocking A.C. transmission.

With this need in view the present invention provides in a circuit arrangement including at least one semi-conductor device of the kind specified located in an A.C. transmission path a novel biasing circuit for said device comprising rectifier means located in the transmission path between two points therein which are themselves between said device and a point of application to the path of A.C. communication currents, together with two biasing current paths respectively connected to the transmission path at said two points, which biasing circuit is arranged to supply over the current path connected nearest said device a first current of magnitude at least as great as the magnitude of the holding current required for said device, and to supply over the other current path an excess current for combining with received A.C. communication currents and of magnitude such that if an instantaneous A.C. communication current of opposite polarity to it is greater than a predetermined maximum, then the rectifier means is reverse biased.

Thus, with the biasing circuit of the invention the direct current bias for said device can be considered as consisting of two separate currents, the current supplied by the current path connected nearest said device being the effective holding current, while the excess current supplied by the other current path is utilized in conjunction with the rectifier means for limiting the magnitude of received A.C. communication currents which are of opposite polarity to it. By selection of circuit parameters the rectifier means is normally forward biased in the absence of A.C. communication currents and therefore the excess current as well as the holding current flows through said device. The rectifier means is still forward biased when A.C. communication currents of less than a predetermined magnitude are received on the transmission path (these A.C. currents in effect modulating the excess current) but if an instantaneous A.C. communication current is received which is greater than this predetermined magnitude and is of opposite polarity to the excess current, then the consequent over-modulation of the excess current results in the rectifier means becoming reverse biased. This prevents the full magnitude of such instantaneous A.C. communication current from reaching said device and so avoids the possibility of the current through the latter decreasing to below the holding current value.

In order that the invention may be more fully understood, and in describing further features of the invention, reference will now be made to the accompanying drawings in which.

Figure 1:
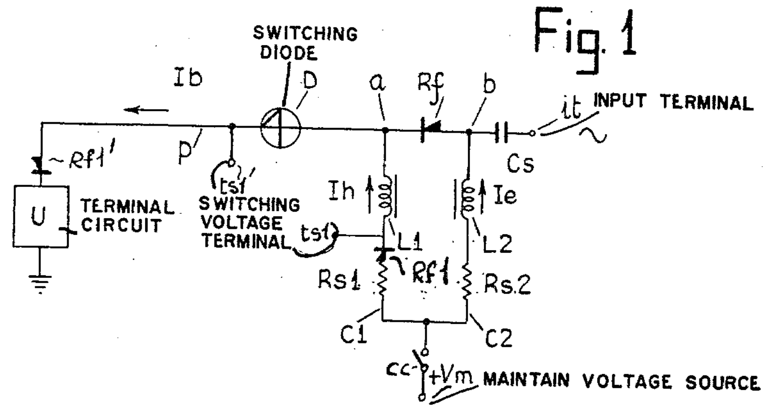
FIG. 1 is a simple circuit arrangement including a biasing circuit conforming to the invention which caters for A.C. communication currents transmitted in one direction through a semi-conductor (two-terminal) switching diode.

Referring to FIG. 1, a four-zone semi-conductor switching diode D which will be assumed to be in the low impedance condition, is connected in a transmission path *p* established between earth and an input terminal *it*. The diode D has been operated to the low impedance condition by the application across it of a suitable switching voltage made up of a positive-going pulse voltage applied to a switching voltage *ts*1 in conjunction with a negative-going pulse voltage applied to another switching voltage terminal $ts1'$ during the persistence of the positive-going pulse voltage. Included in the transmission path *p*, in series with the diode D, is a terminal circuit (represented by the rectangle U) for receiving from the path *p* A.C. communication currents applied to the input terminal *it*. Also included in the transmission path *p*, between the diode D and the input terminal *it*, are a rectifier R*f* and a capacitor C*s*. The rectifier R*f*, together with a first biasing current path *c*1 comprising a series connection of a choke L1, a resistor R*s*1 and a rectifier R*f*1, and a second current path *c*2 comprising a series connection of a choke L2 and a resistor R*s*2, form a biasing circuit conforming to the invention. The current paths *c*1 and *c*2 are connected to the transmission path *p* at connection points *a* and *b* respectively, and feed a holding current I*h* and a forward biasing current I*e* respectively to the path *p* from a maintain voltage source +V*m* which is switched in circuit by means of a make contact *cc* when the path through rectifier R*f* has been ascertained as being the one to be established. Rectifier R*f*1 prevents the positive-going pulse applied at terminal *ts*1 from being shunted by the source +V*m*, and rectifier R*f*1′ prevents the negative-going pulse applied at terminal *ts*1′ from being shunted by earth. The values of components L1 and R*s*1 are such that the holding current I*h* is at least of holding current value for the diode D, while the values of components L2 and R*s*2 are such that the forward biasing current I*e* is of a magnitude appropriate for modulation by A.C. communication currents applied to the input terminal *it*.

In the absence of A.C. communication currents, the potential at point *a* is less positive than the potential at point *b*, due to the currents I*h* and I*e*, so that the rectifier R*f* is forward biased and therefore a bias current I*b* equal to $Ih+Ie$ flows in the path *p* and through the diode D to maintain the latter in its low impedance condition. When A.C. communication currents are received at the input terminal *it*, consequent modulation of the current I*e* by these currents will cause the potential at the point *b* to vary. If an A.C. communication current is received which has an instantaneous magnitude and polarity such as to drive the potential at point *b* more negative than the potential at point *a*, then the rectifier R*f* will become reverse biased. At this time the bias current I*b* will be reduced to the value of I*h* which is still sufficient for maintaining the diode D in the low impedance condition. With the biasing circuit of the invention, therefore, the diode D will always be receiving an adequate holding current irrespective of the magnitude of A.C. communication currents received at the input terminal *it*.

Figures 2, 5:
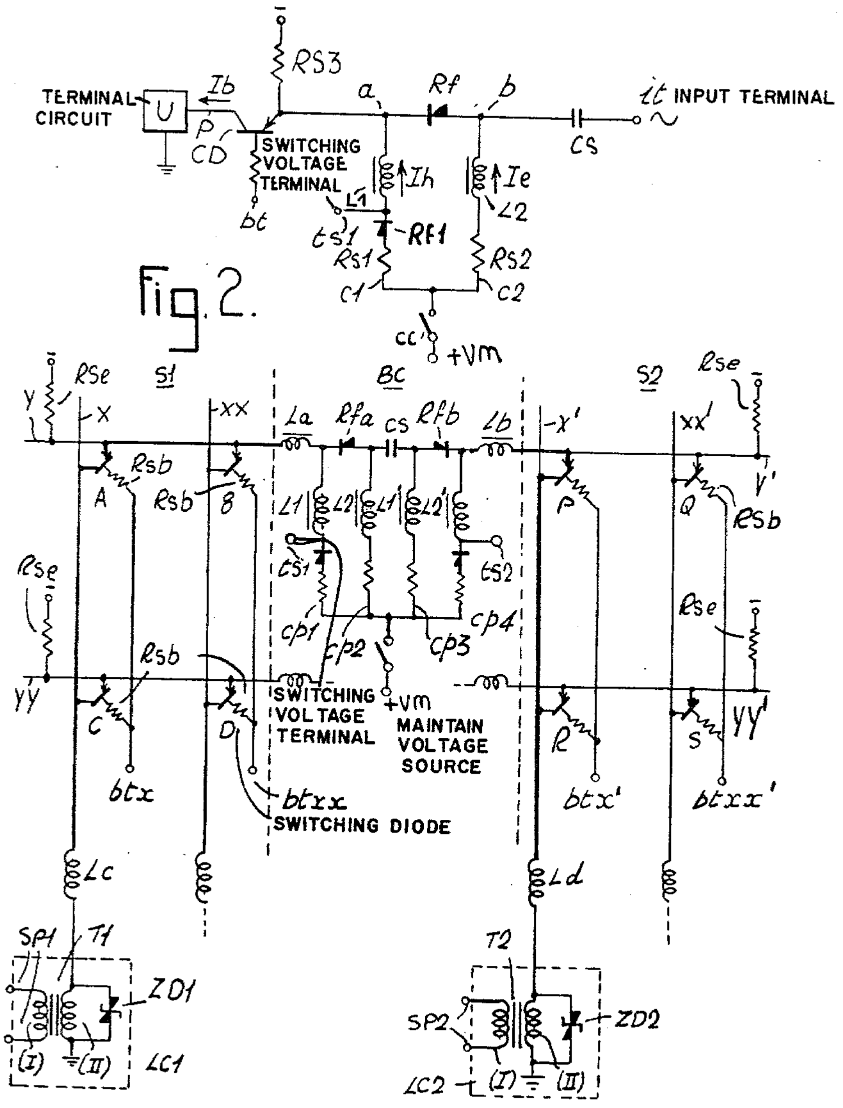
FIG. 2 is a simple circuit arrangement including a biasing circuit conforming to the invention which caters for A.C. communication currents transmitted in the same direction through a semi-conductor (three-terminal) switching trigger diode.
FIG. 5 is a practical circuit arrangement, embodying the invention, which employs semi-conductor (three-terminal) switching trigger diodes.

The circuit arrangement shown in FIG. 2 is very similar to that shown in FIG. 1, differing only in the form of diode employed therein, and corresponding components in these two figures have been given the same references. In FIG. 2 a semi-conductor trigger diode CD has its emitter-collector path connected in the transmission path *p* and current flow through this diode CD to the terminal circuit U is controlled by the biasing circuit in exactly the same manner as just decribed for the diode D of FIG. 1. The trigger diode CD is assumed to have been operated to the low impedance condition by the application between its emitter and base of a suitable switching voltage made up of a positive-going pulse voltage applied to terminal *ts*1 in conjunction with a negative-going pulse voltage applied to a terminal *bt* during the persistence of the positive-going pulse voltage. In the high impedance condition of the diode CD its emitter is held at a negative potential by a negative reference voltage (−) applied to it through a resistor R*s*3, but the breakdown voltage overrides this negative potential in operating the diode CD to the low impedance condition.

Figure 3:
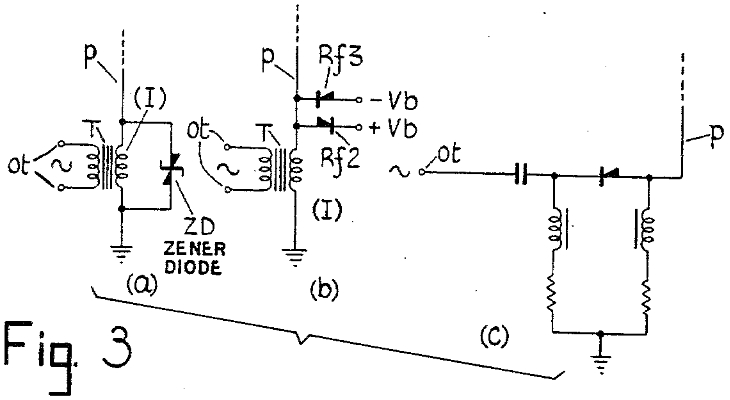
FIG. 3 shows three alternative terminal circuits which are suitable for use in the arrangement of either FIG. 1 or FIG. 2 for limiting the magnitude of A.C. communication currents transmitted in the other direction.

The terminal circuit U in FIGS. 1 and 2 may take one of the three forms shown in FIG. 3. The terminal circuit shown at (*a*) in this latter figure mainly comprises a coupling transformer T which couples a pair of output terminals *ot* to the transmission path *p* so that A.C. communication currents transmitted over the path *p* from the input terminal *it* can be picked up at these output terminals. Also, A.C. communication currents applied to the terminals *ot* (then acting as input terminals) will be induced into the path *p* for transmission thereover to the terminal *it* acting as an output terminal). With regard to A.C. transmission in this direction, winding (I) of the transformer T has connected across it a "double" Zener diode ZD (that is, two Zener diodes connected back-to-back) which is effective for limiting to its own breakdown voltage the A.C. voltage produced by A.C. communication currents applied to the path *p* at this end.

The terminal circuit shown at (*b*) in FIG. 3 is similar to the one shown at (*a*), the only difference being that two rectifiers R*f*2 and R*f*3 are provided for limiting the A.C. voltage in place of the double Zener diode ZD. These rectifiers are connected to clamping voltage terminals +V*b* and −V*b* respectively and, therefore, if an instantaneous A.C. communication current applied to the terminals *ot* tends to produce an A.C. voltage exceeding the clamping voltage V*b* the relevant one of the rectifiers R*f*2 and R*f*3, according to the polarity of the A.C. voltage, will become forward biased and will thereby clamp the A.C. voltage to +V*b* or −V*b*, as the case may be. It will be appreciated, of course, that the biasing circuit employed in FIGS. 1 and 2 provides current clamping of the A.C. communication currents, whereas the terminal circuits shown in FIGS. 3*a* and 3*b* provide voltage clamping.

As shown in FIG. 3(*c*) the terminal circuit U may include a current clamping biasing circuit similar to that shown in FIGS. 1 and 2.

Figure 4:
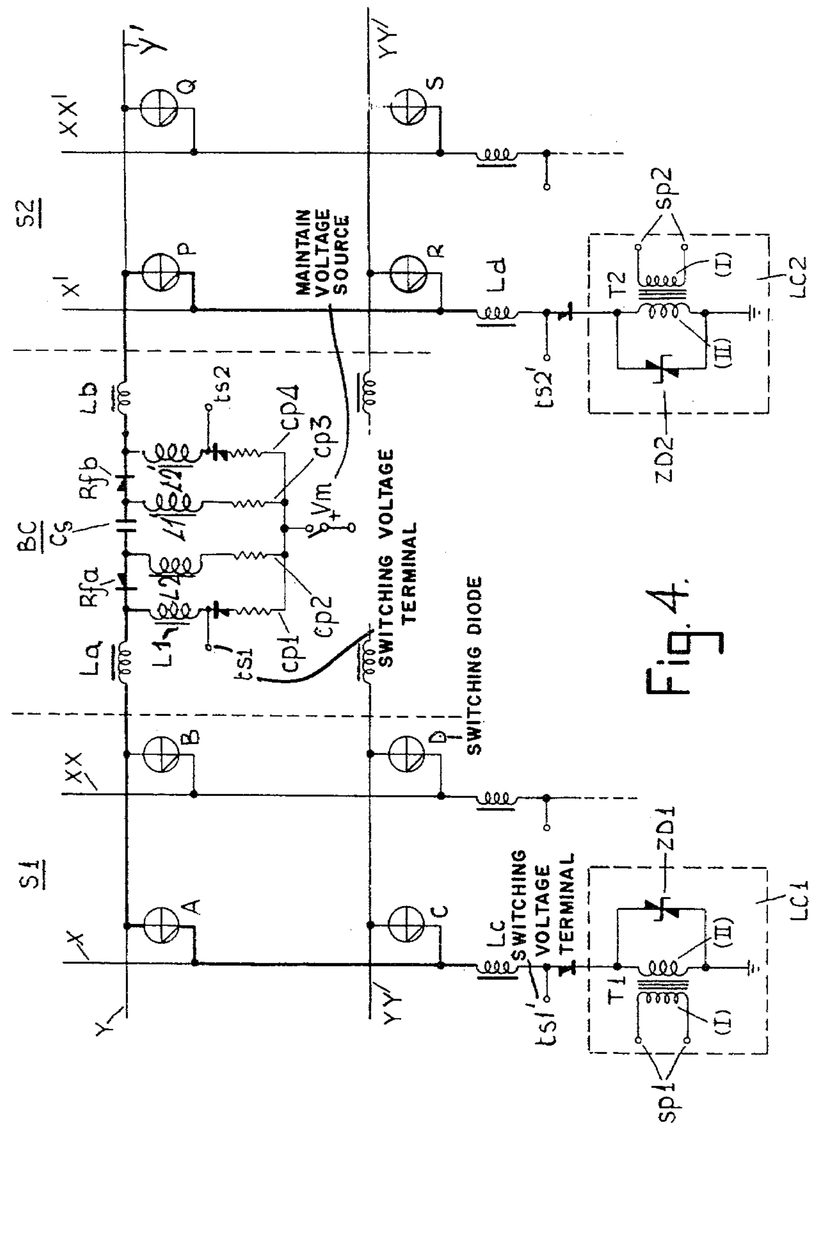
FIG. 4 is a practical circuit arrangement, embodying the invention, which employs semi-conductor (two-terminal) diodes.

In the practical circuit arrangement embodying the invention shown in FIG. 4, two terminal circuits LC1 and LC2 suitable for transmitting and receiving A.C. intelligence (speech currents) are interconnected over a transmission path (shown in heavy line) which is established through two cross-point co-ordinate switching arrangements S1 and S2 and an intervening biasing circuit BC. For the sake of simplicity there is shown in the switching arrangement S1 only two conductors X and XX of one of the two co-ordinate groups of conductors concerned, and only two conductors Y and YY of the other of these two groups, together with four cross-point switching diodes A, B, C and D. It will of course be appreciated that there may in practice be ten or more conductors in each of the two groups, giving correspondingly one hundred or more cross-points. The switching arrangement S2 is similarly represented by two pairs of conductors X′, XX′ and Y′, YY′ with cross-point switching diodes P, Q, R and S. Each of the cross-point diodes is a semi-conductor (two-terminal) switching diode of the kind specified. For the transmission path which is assumed to be established the diodes A and P are in the low impedance condition, this condition having been obtained by the application across these diodes of a suitable swtiching voltage. In the case of the diode A the switching voltage may be the combination of a positive-going pulse voltage and a negative-going pulse voltage applied respectively to a terminal *ts*1 in the biasing circuit BC and to a terminal *ts*1′ connected to the conductor X, while in the case of the diode P it may be the combination of similar voltage pulses applied respectively to terminals *ts*2 and *ts*2′.

The terminal circuit LC1 is associated with the conductor X in the switching arrangement S1 and comprises a coupling transformer T1 having two windings (I, II) for coupling a pair of speech wires *sp*1 to the conductor X. There is connected across winding II a "double" Zener diode ZD1 which serves to limit the peak voltage produced by A.C. intelligence currents applied at the speech wires *sp*1 to its own breakdown voltage. The terminal circuit LC2 similarly comprises a coupling transformer T2 for coupling a pair of speech wires *sp*2 to the conductor X and having a double Zener diode ZD2 connected across its winding (II) for limiting the peak voltage produced by A.C. intelligence currents applied at the speech wires *sp*2 to its own breakdown voltage.

The biasing circuit BC is symmetrical about a capacitor C*s* which is included in a link connection between the conductors Y and Y'. The biasing circuit BC comprises two current paths *cp*1 and *cp*2 connected to the transmission path at one side of this capacitor, and two current paths *cp*3, *cp*4 connected to the transmission path at the other side of this capacitor. Between the points of connection of the two pairs of current paths *cp*1, *cp*2 and *cp*3, *cp*4 are located respective rectifiers R*fa* and R*fb*. It will be seen that the biasing circuit BC consists of two sections each similar to the biasing circuit shown in FIGS. 1 and 2. The left-hand section provides current clamping for A.C. intelligence currents transmitted from terminal circuit LC2 to terminal circuit LC1, and the right-hand section provides current clamping for A.C. intelligence currents transmitted from terminal circuit LC1 to terminal circuit LC2.

The practical circuit arrangement shown in FIG. 5 is very similar to that shown in FIG. 4 and here also corresponding components in these two figures have been given the same references. Its only difference lies in the employment of (three-terminal) trigger diodes, rather than (two-terminal) diodes, at the cross-points of the co-ordinate switching arrangements S1 and S2. Each of these cross-point trigger diodes has an individual base resistor R*sb* of which those for diodes appertaining to the same (vertical) ordinate are connected in common to a terminal *btx*, *btxx*, *btx'* or *btxx'*, as the case may be, which is normally held at a relatively positive potential. On the other hand the emitter of the diodes appertaining to the same (horizontal) ordinate are connected through a common emitter resistor R*se*, one such resistor for each ordinate, to a negative reference voltage (−) which holds the emitter of the diodes at a potential which is negative with respect to the potential at their bases. For the transmission path which is assumed to be established the diodes A and P are in the low impedance condition, this condition having been obtained by the application across these diodes of a suitable switching voltage. In the case of the diode A the switching voltage may be the combination of a positive-going voltage pulse and a negative-going voltage pulse applied respectively to a terminal *ts*1 in the biasing circuit BC and to terminal *btx*, while in the case of the diode P it may be the combination of similar voltage pulses applied respectively to terminals *ts*2 and *btx'*. When a diode is operated to the low impedance condition the positive-going voltage pulse applied to its emitter appears at its collector. In consequence, if for example a transmission path to be established extended through a further co-ordinate switching arrangement located between, say, the switching arrangement S1 and a terminal circuit such as circuit LC1, that is, ordinate conductors X, XX of arrangement S1 are connected to (horizontal) ordinate conductors such as Y, YY of the further arrangement, the voltage pulse may appear at the emitter of the relevant diode in such further arrangement and may serve as the positive-going voltage pulse in respect of that diode.

Figure 6:
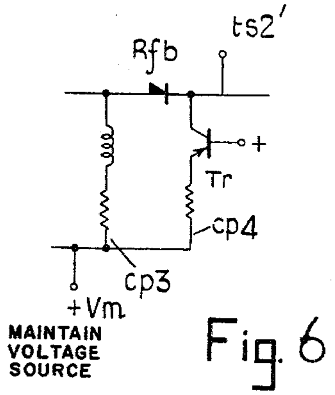
FIG. 6 shows a possible and preferred modification for the arrangement of either FIG. 4 or FIG. 5.

If in either FIG. 4 or FIG. 5 practical considerations call for particularly fast switching in the switching arrangement S2, the choke coil in the nearest current path (*cp*4) in the biasing circut BC may be replaced by a transistor T*r* as shown in FIG. 6. In the event of fast switching requirements for the switching arrangement S1 also, a transistor could likewise be included in the current path *cp*1 instead of the choke coil. In this connection, it will be apparent that a positive-going pulse voltage applied at terminal *ts*1 in order to strike any one of the cross-point diodes associated with conductor Y (the particular diode that is struck depending on which of the co-ordinate conductors such as X' and XX'' or *btx* and *btxx* is appropriately marked at the same time) must be of sufficient duration to take into account the inductance of the choke coil in the current path *cp*1. On the other hand a similar pulse applied at terminal *ts*2' (FIG. 6) can be of much shorter duration than one applied at terminal *ts*2 when the transistor T*r* replaces the choke coil in the current path *cp*4. Providing a transistor has another advantage over a choke coil in that if the transistor is biased so as not to "bottom" it will serve as a constant current device, so that a holding current (I*h*) flowing in the current path *cp*4 will remain constant despite change, within limits, in the impedance presented by a terminal circuit such as circuit LC2, and in the impedance of the transmission as determined, inter alia, by the number of cross-point diodes through which it is established. This means that the transmission path can be switched through to different types of terminal circuit, for instance in the case of a telephone exchange system, to a local line or an outgoing junction, without the value of holding current being affected by the different terminating impedances presented by such circuits or by variation in the impedance of the path as determined by its length. If a choke coil were used, the holding current (I*h*) would vary correspondingly with variation in the impedance of the terminating circuit. The choke coils in the current paths *cp*1, *cp*2 and *cp*3, *cp*4 are provided so as to prevent the A.C. intelligence currents from flowing into the supply source +V*m*. The transistor T*r*, when provided as above, functions in a similar manner since it displays a very high shunt impedance to A.C. intelligence currents of speech frequencies. The simple arrangements shown in FIGS. 1 and 2 could also be modified in the manner shown in FIG. 6.

It will be noticed that the windings (II) of both the transformer T1 and T2 are earthed, thus providing a common earth return for A.C. intelligence currents. This is a desirable feature made possible by the use of the biasing circuit conforming to the invention, because if one of these windings was connected to a supply terminal it would become necessary to provide de-coupling circuits preventing the A.C. intelligence currents flowing into the supply.

The circuit arrangements of FIGS. 4 and 5 also show choke coils L*a*, L*b*, L*c* and L*d* included in the transmission path. The coils L*c* and L*d* are provided to overcome the clamping delay of the "double" Zener diode(s) ZD1 and ZD2, while the choke coils L*a* and L*b* are provided to overcome the delay caused by the hole storage effects occurring in the rectifiers R*fa* and R*fb*. These delays would otherwise momentarily interrupt the holding current through the cross-point diodes A and P which due to their high speed switching, which would revert to their "off" (or high impedance) condition.

What I claim is:

1. A circuit arrangement comprising an alternating current transmission path, an input terminal at which alternating communication currents can be applied to said path and a semiconductor switching diode connected in said path and operable by application of a switching voltage from a high impedance condition to a low impedance condition in which it can thereafter be held by maintaining a holding current through it, the arrangement further including a biasing circuit for said switching diode comprising rectifier means included in the transmission path between said switching diode and said input terminal, a first biasing current path connected to said transmission path at a point between said switching diode and said rectifier means for applying to said transmission path a holding current for said switching diode, and a second biasing current path connected to said transmission path at a point between said rectifier means and said input terminal for applying a forward biasing current for the rectifier means effective to forward bias the rectifier means for passing alternating communication currents unless the instantaneous magnitude and polarity of an alternating communication current is such in relation to said forward biasing current as to cause said rectifier means to become reversely biased.

2. A circuit arrangement as claimed in claim 1, wherein there is provided an energizing source between which and said transmission path said first and second biasing current paths are connected, and wherein said first biasing current path comprises a resistance and a choke having values permitting flow of said holding current between said source and said transmission path, and said second biasing current path comprises a resistance and a choke having values permitting flow of said forward biasing current between said source and said transmission path.

3. A circuit arrangement as claimed in claim 1, wherein there is provided an energizing source between which and said transmission path said first and second biasing current paths are connected, and wherein a transistor having collector, emitter and base electrodes is provided in respect of said second biasing current path, the collector and emitter electrodes of said transistor being connected in series with said second path and the base of the transistor being connected to a bias voltage source for causing the transistor to be operable as a constant current device for supplying said forward biasing current.

4. A circuit arrangement comprising:

two cross-point co-ordinate switching arrangements each comprising first and second groups of co-ordinate conductors and a plurality of semiconductor switching diodes connected one at each cross-point defined between two co-ordinate conductors, said switching diodes being of a kind operable by application of a switching voltage from a high impedance condition to a low impedance condition in which they can thereafter be held by maintaining a holding current through them;

terminal circuits connected to the conductors of said first group in each of the two switching arrangements;

a plurality of link connections between the second groups of conductors of the two switching arrangements;

and means for applying a switching voltage to a selected switching diode in each of the two switching arrangements whereby to establish between two terminal circuits an alternating current transmission path through the switching arrangements and a link connection;

each link connection including an alternating current coupling means which provides direct current isolation between the two co-ordinate conductors which it links and having an associated biasing circuit comprising rectifier means included in the link connection between said coupling means and the two switching arrangements, connection points at opposite sides of each of said rectifier means, first biasing current paths respectively connected to the connection points that are nearer the switching arrangements for applying respective holding currents to the switching diodes of an established transmission path, and second biasing current paths respectively connected to the other connection points for applying respective forward biasing currents for the rectifier means effective to forward bias the rectifier means for passing alternating communication currents unless the instantaneous magnitude and polarity of an alternating commuication current is such in relation to said forward biasing currents as to cause said rectifier means to become reversely biased.

References Cited by the Examiner

UNITED STATES PATENTS

| | | | |
|---|---|---|---|
| 2,855,524 | 10/58 | Shockley | 179—18 |
| 2,972,683 | 2/61 | Lunney | 179—18 |

ROBERT H. ROSE, *Primary Examiner.*

THOMAS B. HABECKER, *Examiner.*